(12) United States Patent
Takikura

(10) Patent No.: US 6,394,380 B2
(45) Date of Patent: May 28, 2002

(54) SPINNING-REEL RECIPROCATING DEVICE

(75) Inventor: Koji Takikura, Izumi (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/885,088

(22) Filed: Jun. 21, 2001

(30) Foreign Application Priority Data

Jul. 6, 2000 (JP) ......................................... 2000-205121

(51) Int. Cl.$^7$ .............................................. A01K 89/015

(52) U.S. Cl. ....................................... 242/279; 242/263

(58) Field of Search ................................ 242/263, 277, 242/278, 279

(56) References Cited

U.S. PATENT DOCUMENTS 2,726,052 A   12/1955   Pons
5,232,181 A   8/1993    Fujine

FOREIGN PATENT DOCUMENTS

GB            645978    11/1950

Primary Examiner—Emmanuel M. Marcelo
(74) Attorney, Agent, or Firm—Shinjyu Global IP Counselors, LLP

(57) ABSTRACT

Spinning-reel oscillation mechanism employing a compact reel body to achieve dense winding of fishing line onto the spool. The spinning reel oscillation mechanism 6 pumps a spool shaft 15, to the forward end of which a spool 4 is mounted, back and forth in cooperation with rotation of a handle assembly 1. The spinning reel oscillation mechanism 6 includes a drive gear 20, a worm 21, a driven gear 23, and a slider 22. The drive gear 20 is fitted non-rotatably on a master gear shaft. The worm 21, superficially into which intersecting helical grooves 21a are formed, is disposed paralleling the spool shaft. The driven gear 23 is provided non-rotatably on the worm. Rotation of the drive gear 20 is transmitted to the driven gear 23. The slider 22 is fitted reciprocatingly in the body of the reel. The slider 22 has an engagement that engages with the helical grooves 21a, and the spool shaft is fitted back-and-forth immovably to the slider 22.

14 Claims, 7 Drawing Sheets

SPINNING-REEL RECIPROCATING DEVICE

BACKGROUND OF THE INVENTION

1. Technical Field

The present invention relates to reciprocating devices, and in particular to spinning-reel reciprocating devices that pump the spool back and forth in cooperation with rotation of the handle.

2. Description of Related Art

Spinning-reel transverse-cam oscillating mechanisms (one example of a reciprocating device) include a driven gear meshing with a pinion gear, a worm shaft (worm hereinafter), and a slider meshing with the worm. The worm is mounted to the front end of the driven gear and arranged in parallel with the spool shaft. The spool shaft is mounted to the slider and is axially immobile with respect to the slider.

In this type of transverse cam oscillating mechanism, the amount that the spool travels per rotation of the rotor depends on the lead angle of the worm, and the gear ratio between the pinion gear and the driven gear. This means that the largeness of the inter-winding interval keeps the fishing line from winding on very efficiently.

In this respect, JP H11-86A (1999) discloses an oscillating mechanism having a dense-winding construction by which the amount that the spool is pumped back and forth for a rotation of the handle is lessened to enable the fishing line to wind closely onto the spool. The oscillating mechanism is provided with: a linking shaft disposed along an axis skew with the pinion gear so as to orient toward the worm, for transmitting handle rotation to the worm; a screw gear fixed to one end of the linking shaft and meshing with the pinion gear; a worm gear fixed to the other end of the linking shaft; and a worm wheel fitted non-rotatably to the worm and meshing with the worm gear. The linking shaft, linking the pinion gear and the worm, is arranged diagonally in the reel body along an axis skew with the pinion gear to serve to make the reel body thinner.

In the foregoing conventional configuration, given that a gear is meshed with a pinion gear that is geared-up by the face gear, there therefore has to be a large gearing-down in between the two gears mounted on the linking shaft, and the gear mounted on the worm. This means that the gears mounted on the linking shaft will be large. Further, because the linking shaft is disposed along an axis skew with the pinion gear so as to orient toward the worm, a portion of the linking shaft projects from the reel body and the reel body has to be formed with a bulge. These factors keep the reel body from having a compact construction.

SUMMARY OF THE INVENTION

An object of the present invention is by a compact reel body to realize a dense-winding structure for spinning-reel reciprocating devices.

According to a first aspect of the present invention, a spinning-reel reciprocating device-disposed along an axis skew with a handle rotation shaft provided in the reel body of a spinning-reel, for reciprocating a spool shaft, forward-endwise onto which a spool is fitted, back and forth in cooperation with rotation of the handle-includes a drive gear, a worm, a driven gear, and a slider. The drive gear is fitted non-rotatably onto the handle rotation shaft. The worm, superficially into which crisscrossing helical grooves are formed, is disposed substantially paralleling the spool shaft. Rotation of the drive gear is transmitted to the driven gear, which is provided non-rotatably on the worm. The spool shaft is fitted immovably, at least back-and-forth, to the slider, which is fitted reciprocatingly in the reel body. The slider has an engagement member for engaging with the helical grooves.

The drive gear provided on the rotation shaft rotates in this reciprocation mechanism in cooperation with turning of the handle, and the rotation is transmitted to the driven gear, which thus rotating the worm. The rotation of the handle, which rotates at a lower speed than the pinion shaft, is transmitted via the driven gear to the worm, so that dense winding is realized without an overly large gear-down ratio, which keeps the diameter of the driven gear small. Moreover, because the drive gear is provided on the handle and the driven gear is provided on the worm, the drive and driven gears hardly affect the size of the reel body. A compact reel body therefore realizes a dense-winding structure.

According to a second aspect of the present invention, a spinning reel reciprocating device as in the first aspect further includes an intermediate gear unit rotating around an axis that is parallel to the rotation shaft of the handle, the intermediate gear unit meshing with the drive gear and the driven gear. The intermediate gear relaxes the placement restrictions on the driven gear, so that the driven gear can be disposed where comparatively there is spatial leeway. Moreover, because the intermediate gear unit rotates around an axis that that parallels the handle rotational shaft, it hardly affects the size of the reel unit. A compact reel body therefore further realizes a dense-winding structure.

According to a third aspect of the present invention, in a spinning reel reciprocating device as in the second aspect, the intermediate gear unit is a cylindrical gear, as a spur gear or a helical gear, meshing with the drive gear and the driven gear, and the driven gear is a crown gear rotating around an axis intersecting with the intermediate gear unit. Herein, a dense-winding structure is realized with a simple construction.

According to a fourth aspect of the present invention, in a spinning reel reciprocating device as in the second aspect, the intermediate gear unit includes a first gear meshing with the drive gear, and a second gear meshing with the driven gear, and rotating unitarily with the first gear. This configuration relaxes the placement restrictions on the driven gear further to realize a dense-winding structure with a compact reel. Moreover, it enables gearing-down between the drive gear and the first gear and between the second gear and the driven gear, still further realizing a dense-winding makeup.

According to a fifth aspect of the present invention, in a spinning reel reciprocating device as in the fourth aspect, the second gear is a cylindrical gear whose diameter is smaller than that of the first gear, and the driven gear is a crown gear rotating around an axis that is intersecting with respect to the intermediate gear unit. Herein a simple construction realizes a dense-winding structure.

According to a sixth aspect of the present invention, in a spinning reel reciprocating device as in the fourth aspect, the second gear and the driven gear are bevel gears rotating around intersecting axes. With this configuration, a relatively large torque can be transmitted efficiently.

According to a seventh aspect of the present invention, in a spinning reel reciprocating device as in the fourth aspect, the second gear has fewer teeth than the driven gear. This configuration enables gearing-down between the second gear and the driven gear, even further realizing a dense-winding structure.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration and Reel Unit Configuration

Figure 1:
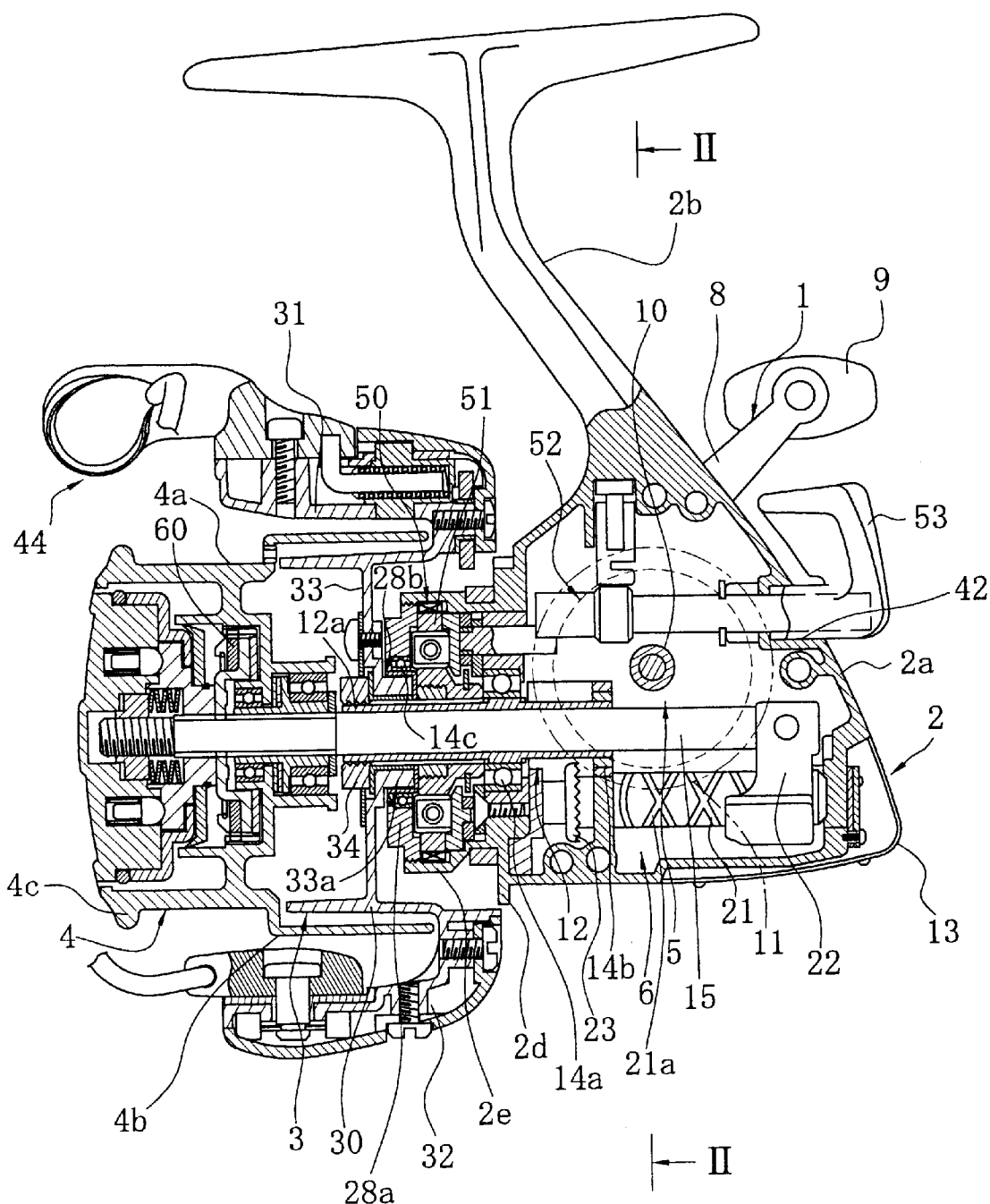
FIG. 1 is a left-side, partly in section view of a spinning reel in which an embodiment of the present invention is adopted.

As shown in FIG. 1, a spinning reel in accordance with an embodiment of the present invention winds fishing line around an axis that is substantially parallel to the fishing rod on which it is mounted, and includes a rotor 3, a spool 4, and a reel unit 2 including a handle assembly 1. The rotor 3 is rotatively supported at the front of the reel unit 2. Fishing line is wound around the outer peripheral surface of the spool 4, which is disposed at the front of the rotor 3 and can be shifted back and forth.

Figure 2:
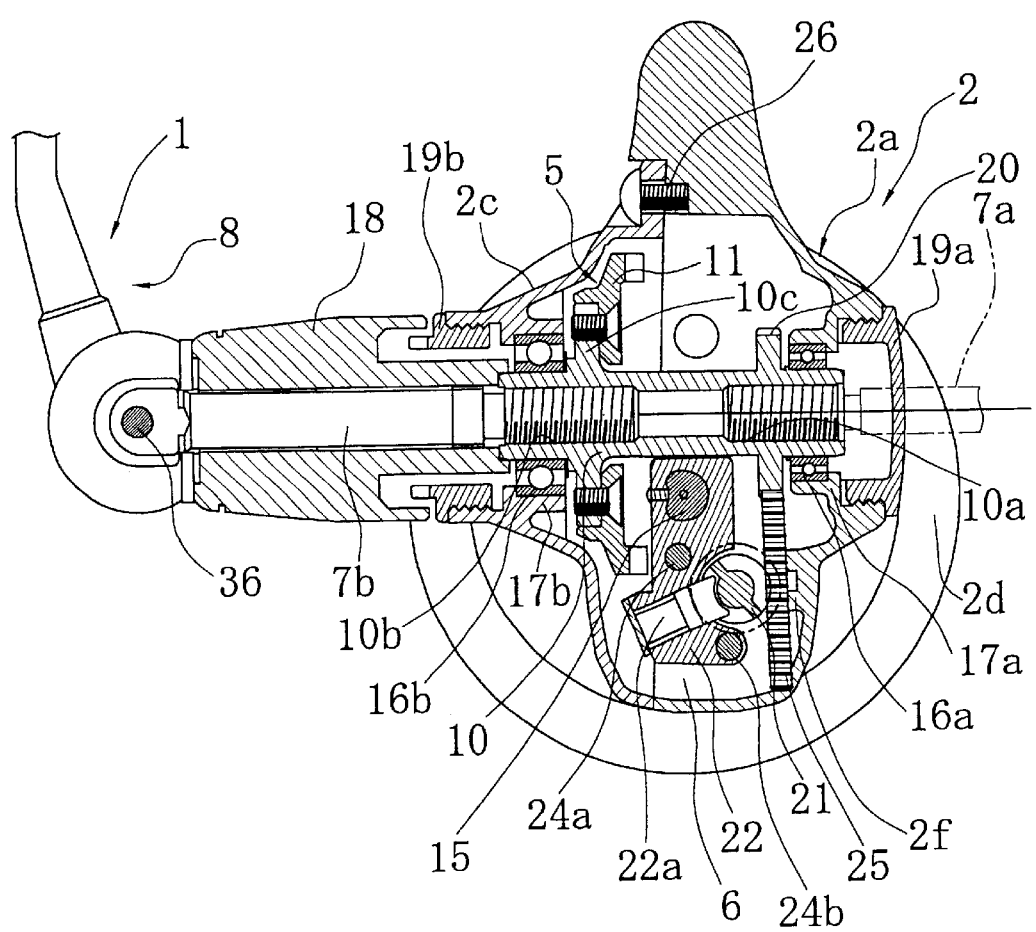
FIG. 2 is a sectional view seen from the front along the line II—II in FIG. 1.
Figure 3:
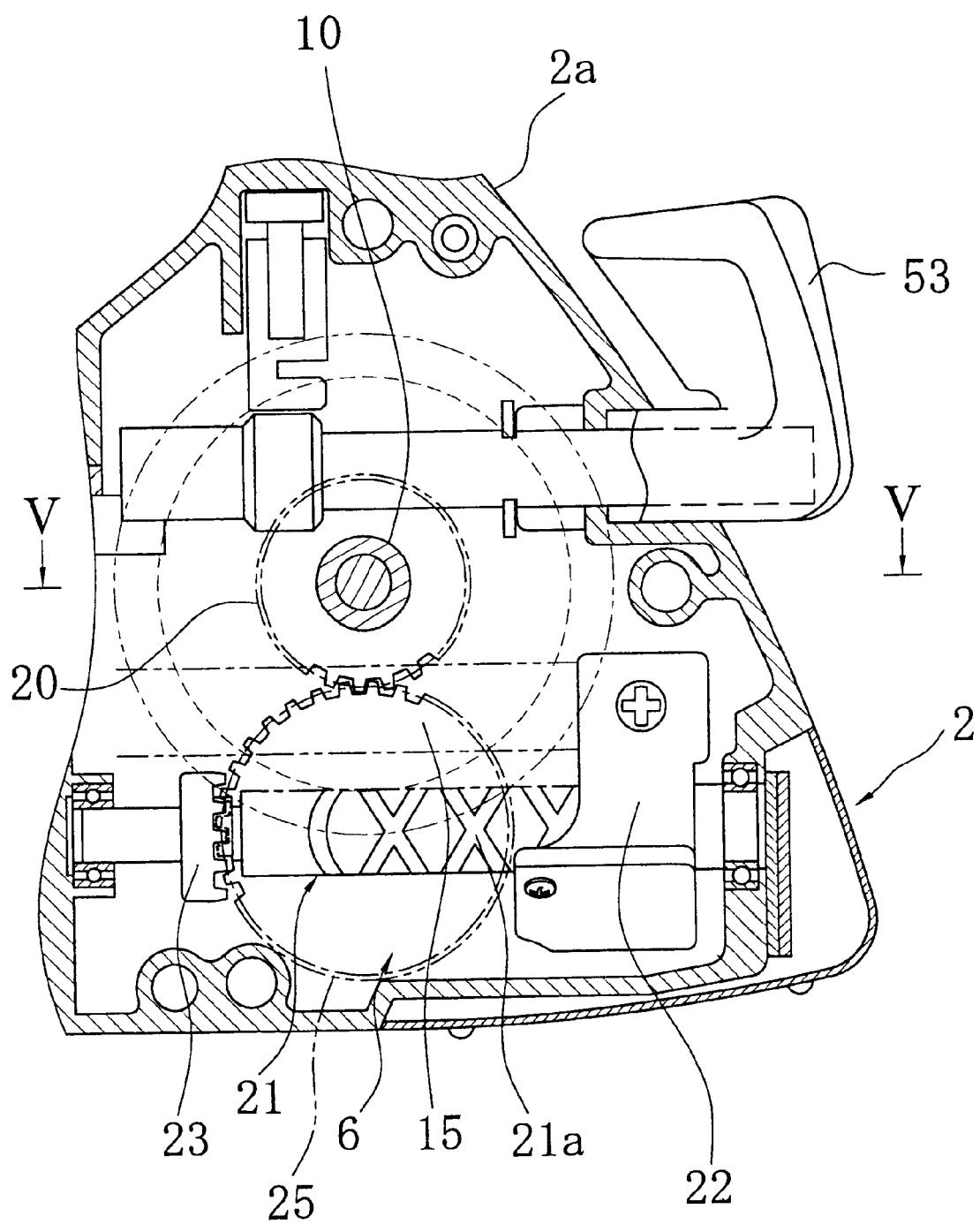
FIG. 3 is a fragmentary vertical section view of the oscillation mechanism, enlarged from FIG. 1.

As shown in FIG. 2, the handle assembly 1 is a component screw-joined onto a master gear shaft 10 (an example of a handle rotation shaft) that composes a part of the rotor driving mechanism 5 (explained below). The handle assembly 1 is removably and non-rotatably attachable to either end of the master gear shaft 10. The handle assembly 1 includes: right and left handle-shafts 7a and 7b screw-joined to the master gear shaft 10; a crank arm 8 removably attachable to either the right or left handle-shaft 7a/7b, therein non-rotatable but pivotable with respect to the right and left handle shafts 7a, 7b; and a handle grip 9 attached, rotatively about an axis that parallels the handle shaft 7a (or 7b), to the lead end of the crank arm 8. The crank arm 8 is removably attached with a screw 36 to the handle shaft 7a (or 7b). A locking member 18 is fitted around the handle shaft 7a to which the crank arm 8 is mounted. The locking member 18 can be switched between a locked state in which the crank arm 8 cannot pivot with respect to the handle shaft and a released state in which the crank arm 8 can pivot with respect to the handle shaft.

As shown in FIG. 1, the reel unit 2 includes a reel body 2a, a T-shaped rod attachment leg 2b extending diagonally upward to the front from the reel body 2a and formed unitarily therewith, and a lid 2c (FIG. 2) attached removably to the reel body 2a. The reel body 2a has a space inside, which accommodates a rotor driving mechanism 5 and an oscillation mechanism 6. The rotor driving mechanism 5 transmits the rotation of the handle assembly 1 to rotate the rotor 3. The oscillation mechanism 6 is for pumping the spool 4 back and forth to wind fishing line onto it uniformly.

At the front of the reel body 2a, a circular flange portion 2d is formed with the lid 2c covering the rear of the rotor 3. A tubular, portion 2e protruding into the rotor 3 is formed at the front of the flange portion 2d.

As shown in FIG. 2, a boss 17a is formed in the right lateral wall of the reel body 2a. The boss 17a protrudes inward into the reel body 2a, so as to accommodate a bearing 16a supporting the right end (as shown in FIG. 2) of the master gear shaft 10. A boss 17b is also formed in the lid 2c, opposite the boss 17a. The boss 17b is formed protruding into and out of the reel body 2a, to accommodate a bearing 16b that supports the left end (as shown in FIG. 2) of the master gear shaft 10. The boss that is arranged away from the side where the handle assembly 1 is mounted (boss 17a in FIG. 2) is covered by a shaft cover 19a. The boss that is arranged on the side where the handle assembly 1 is mounted (boss 17b in FIG. 2) is protected against intrusion of water by a perforated cover 19b.

Rotor Configuration

As shown in FIG. 1, the rotor 3 includes a cylindrical portion 30 having a rear-end opening, and first and second rotor arms 31 and 32, disposed opposing each other laterally on the cylindrical portion 30. The cylindrical portion 30 and the two rotor arms 31 and 32 are formed unitarily.

The cylindrical portion 30 is disposed to the outer peripheral side of the tubular portion 2e of the reel body 2a. The open rear portion of the cylindrical portion 30 is covered by the flange portion 2d. A front wall 33 is formed in a forward portion of the cylindrical portion 30, and a boss 33a is formed at the center of the front wall 33. A front portion 12a of the pinion gear 12 and the spool shaft 15 are passed through a through-hole in the boss 33a. A nut 34 is disposed on the front of the front wall 33, and this nut 34 fastens the rotor 3 to the pinion. gear 12 by screwing it to a threaded portion on the front end of the pinion gear 12.

A bail arm 44 for guiding the fishing line to the spool 4 is provided on the tips of the first and second rotor arms 31 and 32, pivotable between line-winding and line-releasing positions.

A reverse rotation check mechanism 50 for the rotor 3 is provided in the space in front of the cylindrical portion 30 of the rotor 3. The reverse rotation check mechanism 50 has a roller-type one-way clutch 51 and an operating mechanism 52 for switching the one-way clutch 51 between an operating state and a non-operating state. The one-way clutch 51 has an outer ring fastened to the reel body 2a and an inner ring mounted non-rotatively to the pinion gear 12. The operating mechanism 52 includes an operating lever 53 disposed on the rear of the reel body 2a. The one-way clutch can be switched between its two positions by pivoting the operating lever 53. When the one-way clutch 51 is in the operating state, the rotor 3 cannot rotate in reverse, and when it is in the non-operating state, the rotor 3 can rotate in reverse.

Spool Configuration

The spool 4 is arranged between the first rotor arm 31 and the second rotor arm 32 of the rotor 3, and is fastened to the front end of the spool shaft 15 with the:drag mechanism 60 interposed between the spool shaft 15 and the spool 4. The spool 4 includes an arbor 4a circumferentially onto which fishing line is wound, a skirt portion 4b formed unitarily with the rear end of the arbor 4a, and a front flange portion 4c attached to the front of the arbor 4a. The arbor 4a is a cylindrical member that extends along the outer peripheral side of the cylindrical portion. 30 of the rotor 3. The skirt portion 4b and the front flange portion 4c extend radially outward perpendicularly on either end of the arbor 4a.

Thereby, the number of windings per layer of fishing line is made approximately the same when the fishing line is being wound around the arbor 4a of the spool 4.

Rotor Driving Mechanism Configuration

Figure 4:
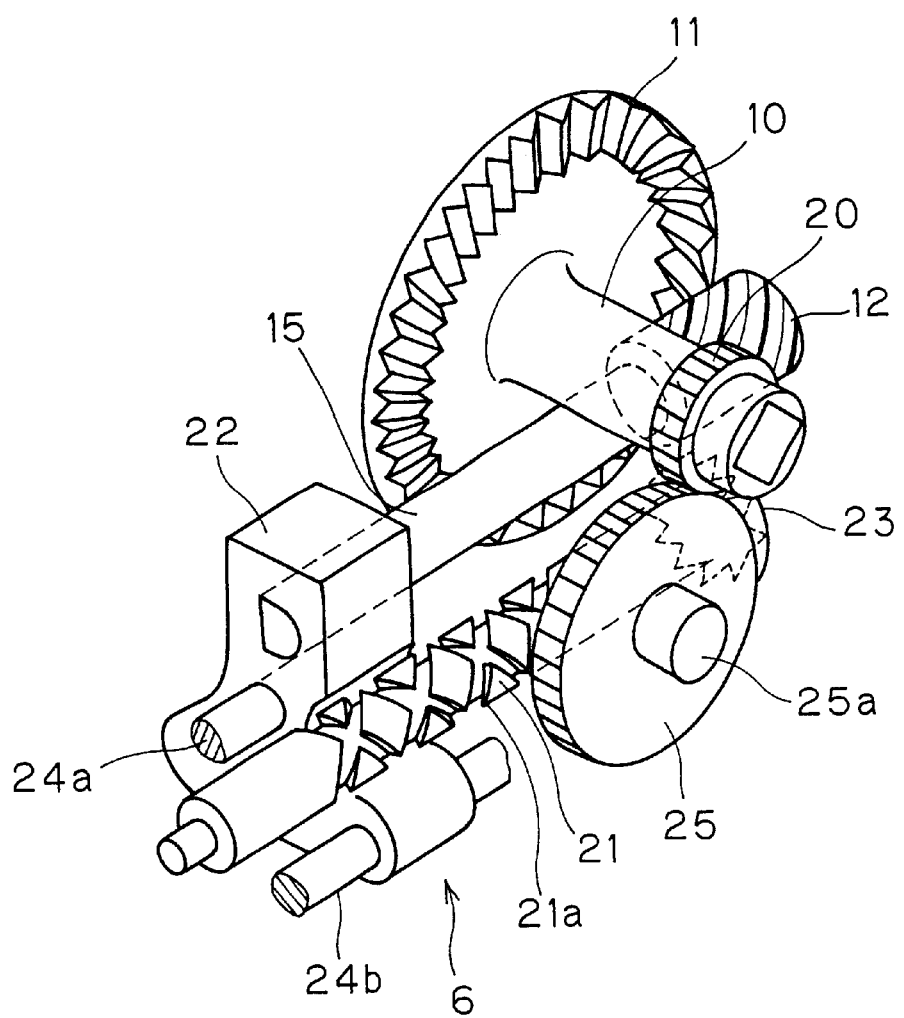
FIG. 4 is an oblique view of the oscillation mechanism, shown removed from the spinning reel.
Figure 5:
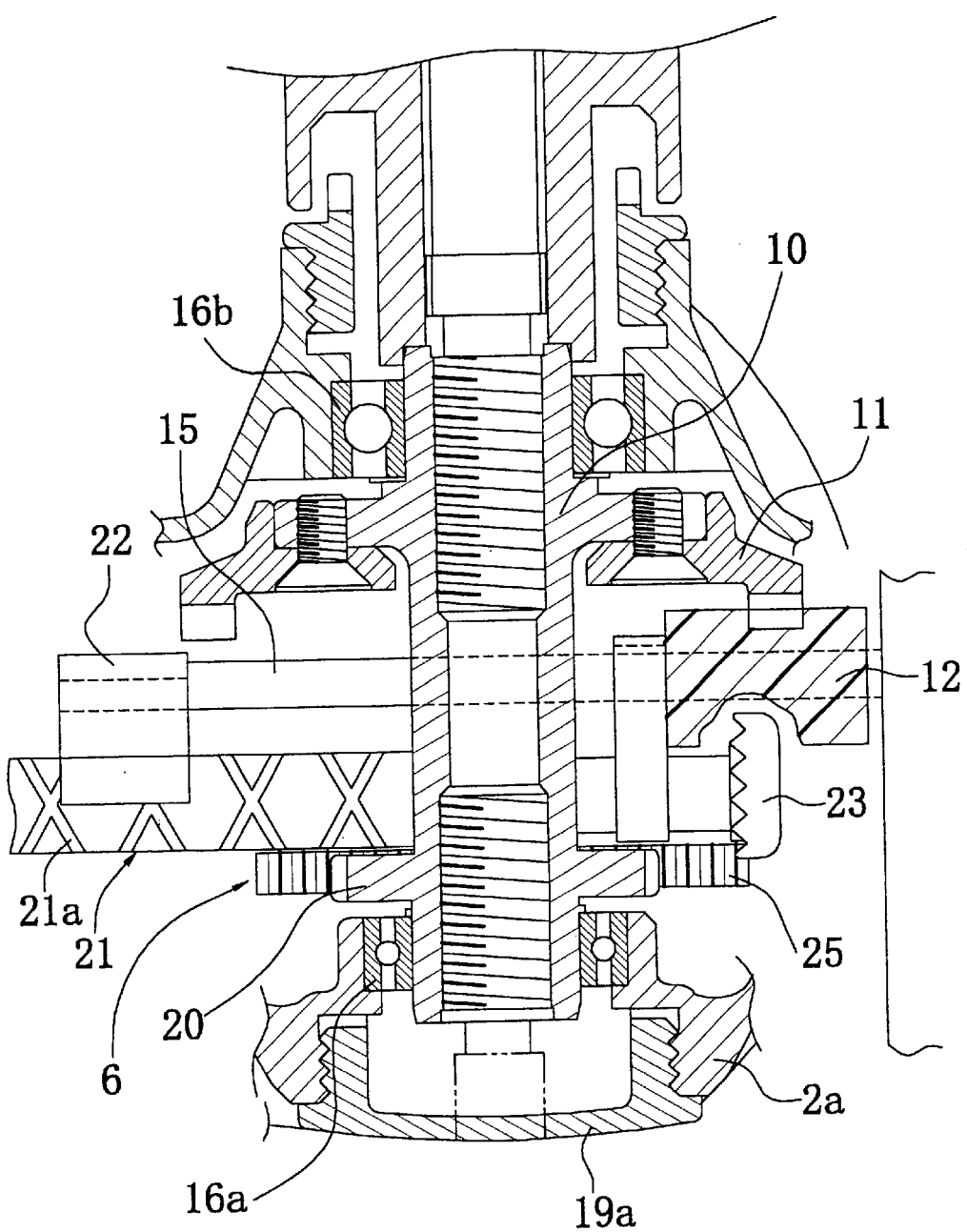
FIG. 5 is a sectional view along the line V—V in FIG. 3.

As shown in FIGS. 2 and 4, the rotor driving mechanism 5 includes a master gear shaft 10, a master gear 11 and a pinion gear 12. The master gear 11 rotates unitarily with the master gear shaft 10, to which the handle assembly 1 is mounted non-rotatively. The pinion gear 12 meshes with the master gear 11. Both ends of the master gear shaft 10 are supported rotatively by ball bearings 16a and 16b in the reel body 2a.

The right end of the master gear shaft 10 is formed with right-hand female threads 10a for screw-joining with the right handle-shaft 7a. The left end of the master gear shaft 10 is formed with left-hand female threads 10b for screw-joining with a left handle-shaft 7b. Furthermore, a disk-shaped flange portion 10c for removably mounting the master gear 11 concentrically is formed on a left-endward, circumferential portion of the master gear shaft 10.

As shown in FIG. 1, the pinion gear 12 is fitted in the reel body 2 to let it rotate about a rotational axis paralleling the axial direction of the fishing rod. The front portion 12a of the pinion gear 12 passes through the center of the rotor 3 and is fastened to the rotor 3 with a nut 34. The reel body 2 rotatively supports the pinion gear 12; and the bearings 14a, 14b and 14c, retain respectively the middle, rear and front portions of the pinion gear 12. The bearing 14b on the rear end is a sliding bearing made, for example, of a synthetic resin. The bearing 14c on the forward end is attached to the inside of a fixing member 28a that is fixed to the front of the cylindrical portion 30. A sealing member 28b is attached to the inner side at the front of the fixed member 28a. The spool shaft 15 passes through the inside of the pinion gear 12. The pinion gear 12 meshes with the master gear 11 and with the oscillation mechanism 6.

Oscillation Mechanism Configuration

The oscillation mechanism 6 as shown in FIGS. 2 to 5, is a device that pumps the spool shaft 15, on the forward end of which the spool 4 is mounted, back and forth in cooperation with rotation of the handle assembly 1. The oscillation mechanism 6 includes a drive gear 20 that rotates unitarily with the master gear shaft 10, a worm 21 disposed paralleling the spool shaft 15, a driven gear 23 provided non-rotatively on the worm 21, a slider 22 that is reciprocated by the worm 21 rotating, and an intermediate gear 25 arranged between the drive gear 20 and the driven gear 23 and meshing with the two gears 20 and 23. The drive gear 20 is a spur gear formed unitarily with the master gear shaft 10.

The worm 21 is disposed paralleling the spool shaft 15, and is supported rotatively at the front and rear on bearings in the reel body 2a. Crisscrossing helical grooves 21a are formed outer circumferentially into the worm 21. the lead angle θ of the grooves 21a is set to 20° to 45°. Here, the "lead angle θ" of the grooves 21a is the angular measure expressed by:

lead angle θ=arccot(πD/L)

wherein D is the bottom diameter of the grooves 21a, and L, i.e. the lead, is the length by which the worm 21 advances axially through one rotation. If the lead angle θ is smaller than 20°, the inter-groove thickness will be unsatisfactorily thin, and at the same time the number of groove intersections will undesirably increase. On the other hand, if the lead angle θ exceeds 45°, the efficiency with which rotational movement is converted into linear movement decreases, which is also undesirable.

The slider 22 includes an engaging member 22a accommodated inside the slider 22. The slider 22 is guided in parallel to the spool shaft 15 by the guide shafts 24a and 24b. The engaging member 22a is fitted turnably within the slider 22, and the front end of the engaging member 22a meshes with the grooves 21a in the worm 21.

The driven gear 23 is mounted non-rotatively to the front end of the worm 21, which is skew with the master gear shaft 10. The driven gear 23 is a crown gear that meshes with the intermediate gear 25.

The intermediate gear 25 is a spur gear, and is cantilever-supported on the inner wall of the reel body 2a, rotatively around an axis that is parallel to the master gear shaft 10 and orthogonal to the worm 21. A shaft portion 25a protrudes from the center of the intermediate gear 25 and is fitted rotatively in a boss 2f formed in the inner wall of the reel body 2a. The intermediate gear 25 is furnished because if the drive gear 20 were to mesh directly with the driven gear 23, the worm 21 location would have to be brought nearer to the master gear shaft 10, restricting placement of the worm 21. Furnishing the intermediate gear 25 raises the degree of freedom for placement of the worm 21.

When rotation is transmitted to the worm 21 from the drive gear 20 rotating unitarily with the master gear shaft 10, which rotates at a lower speed than the pinion gear 12, the rotational speed of the worm 21 is then geared down without overly increasing the gear-down ratios of the drive gear 20 and the driven gear 23. This keeps the diameter of the driven gear 23 small. Moreover, since the drive gear 20 is provided on the master gear shaft 10, and the driven gear 23 is provided on the worm 21, despite furnishing the oscillation mechanism 6 with the drive gear 20 and the driven gear 23 the size of the reel body is hardly affected. A dense-winding structure is therefore realized with a compact reel body 2.

In this embodiment, the drive gear has eight teeth, and the driven gear 23 has twelve teeth, for example. Furthermore, the pinion gear 12 has eight teeth, and the master gear 11 has forty teeth, for example. In the conventional case of transmitting rotation from the pinion gear 12 to the driven gear, since the pinion gear 12 rotates at five times the speed of the master gear shaft (handle shaft) 10, the worm 21 still rotates at 1.25 times the speed of the master gear shaft 10, even if the gear-down ratio between the pinion gear 12 and the worm 21 is set to 4:1. However, in this embodiment, an intermediate gear 25 is provided between the driven gear 23 and the drive gear 20, so that the gear-down ratio between the two is 3:2. Consequently, the worm 21 rotates at ⅔ the speed of the master gear shaft 10. Thus a small gear-down ratio reduces the rotation speed of the worm 21, and a dense-winding structure is realized by a compact reel body 2. it should be understood that in FIGS. 3 to 5 these exact numbers of teeth are not illustrated.

Reel Handling and Operation

When casting with this spinning reel, the bail arm 44 trips over from the line-winding position to the line-releasing position. Then, the tackle is cast by swinging the rod. Thus, fishing line is released in a helical fashion from the front end of the spool 4. In this situation, the fishing line is wound densely around the spool 4, so that there is low releasing resistance.

When winding on fishing line, the bail arm 44 is tripped over into the line-winding position. This happens automatically due to the action of a cam and a spring (not shown in the drawings) when the handle 1 is turned in the line-winding direction. When the handle 1 is turned in the line-winding direction, its torque is transmitted via the master gear shaft 10 and the master gear 11 to the pinion gear 12. The torque transmitted to the pinion gear 12 is transmitted via the front portion 12a of the pinion gear 12 to the rotor 3, rotating the rotor 3 in the line-winding direction.

Meanwhile, the drive gear 20 rotates and its rotation is transmitted via the intermediate gear 25 to the driven gear 23. As a result, the worm 21 rotates at, for example, ⅔ the rotational speed of the master gear shaft 10 (the rotational speed of the handle 1). The rotation of the worm 21 causes the slider 22 meshing with the grooves 21a in the worm 21 to shift back and forth, guided by the guide shafts 24a and 24b, thus pumping the spool 4 back and forth. Fishing line is guided onto the spool 4 by the bail arm 44 and wound densely around the arbor 4a of the spool 4. Thus, the fishing line is wound highly efficiently onto the spool 4.

Figure 6:
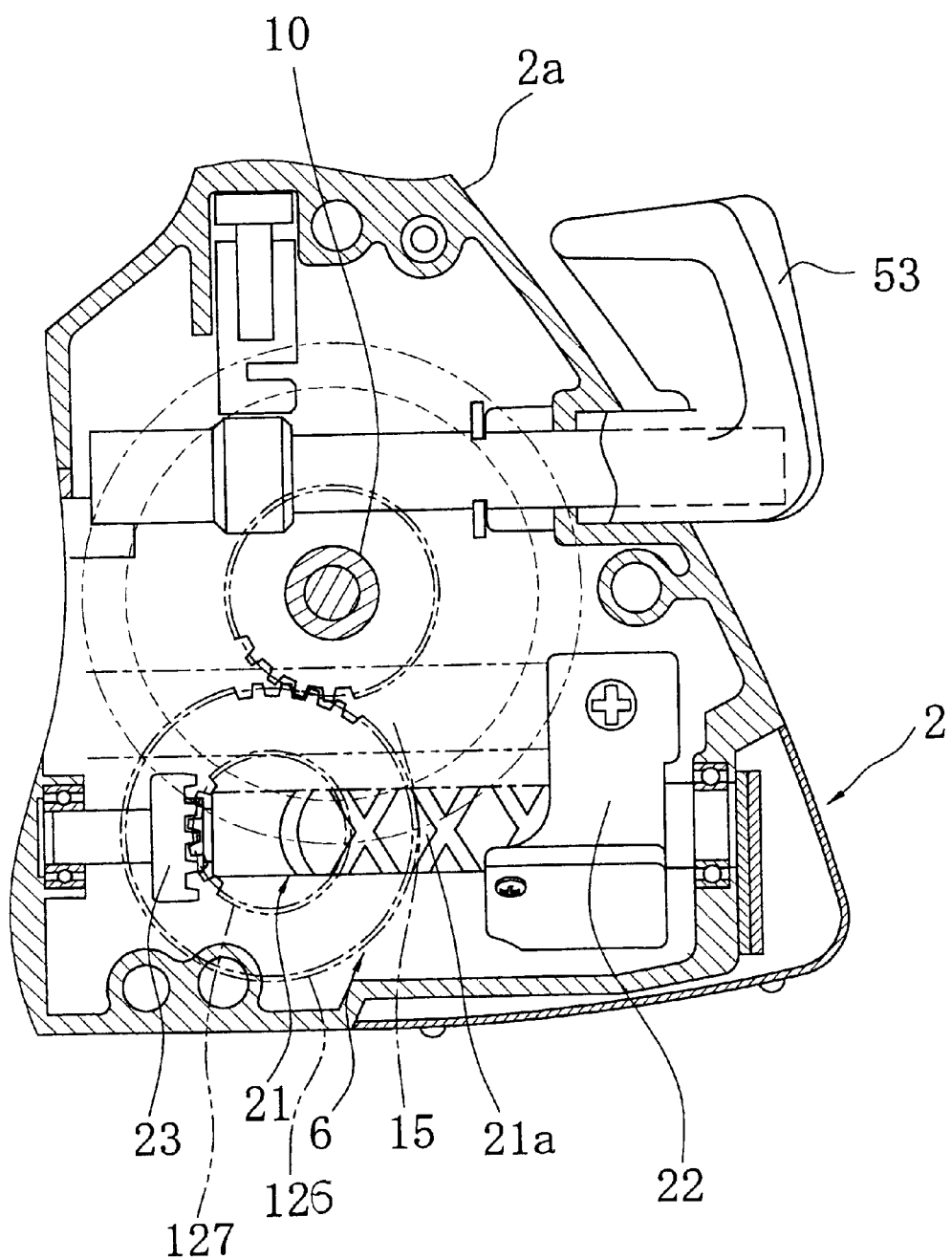
FIG. 6 is a view corresponding to FIG. 3, but of another embodiment.
Figure 7:
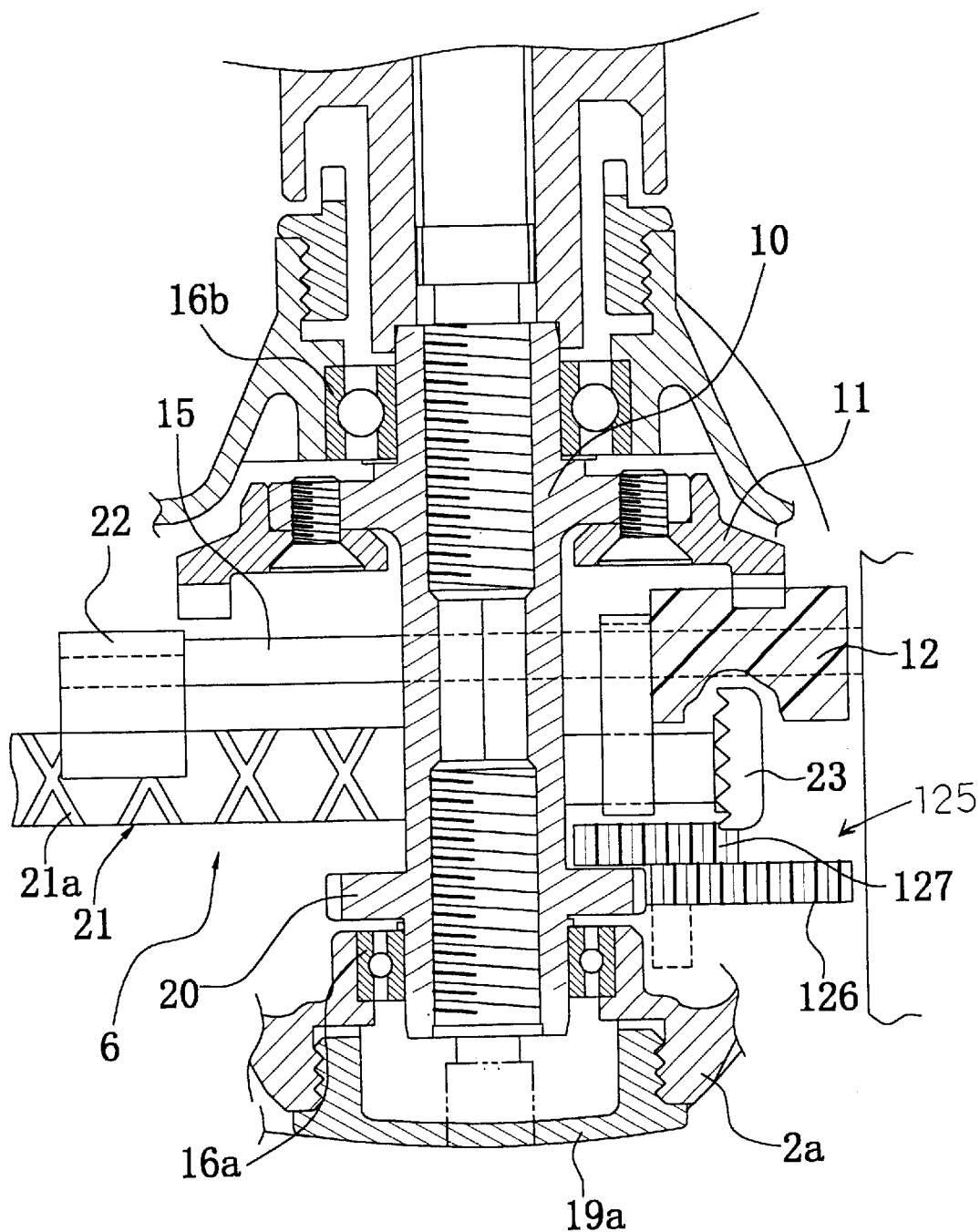
FIG. 7 is a view corresponding to FIG. 5, of the other embodiment.

Other Embodiments (a) As shown in FIGS. 6 and 7, an intermediate gear 125 can be configured as a larger gear 126 and a smaller gear 127, arranged concentrically and rotating unitarily, thus providing further gearing down with the intermediate gear 125. The large gear 126 meshes with the drive gear 20, whereas the small gear 127 meshes with the driven gear 23. If the large gear 126 has, for example, twenty teeth, the small gear 127 has twelve teeth, and the other gears have the same number of teeth as in the previous embodiment, then a 5:2 gear-down ratio is attained between the drive gear 20 and the large gear 126, and a 3:2 gear-down ratio is attained between the small gear 127 and the driven gear 23. As a result, the rotation of the master gear shaft 10 is geared down 15:4 and transmitted to the worm 21. This enables even denser winding.

(b) The foregoing embodiments have been described for the example of a front-drag type of spinning reel, but the present invention can also be applied to oscillation mechanisms in rear-drag type spinning reels, for example. In that case, the spool shaft is coupled rotatively and axially immovably to the slider. Moreover, the present invention can also be applied to oscillation mechanisms for lever brake type spinning reels and inspool type spinning reels.

(c) In the above embodiments, a crown gear is used for the driven gear, but it is possible to use any configuration of gears in which rotational movement is transmitted between two intersecting or skew rotational axes, as for example, with bevel gears, crossed helical gears, or hypoid gears.

(d) In the above embodiments, an intermediate gear 25 was used to simplify the arrangement of the worm, but it is also possible to transmit the rotation of the master gear shaft 10 directly to the worm, without an intermediate gear 25. For example, it is possible to configure the drive gear as a worm gear, and the driven gear as a worm wheel, and transmit the rotation of the master gear shaft 10 directly to the worm 21. A configuration in this way further realizes a dense-winding structure with a compact reel body 2.

With the present invention, the rotation of the handle, whose speed is lower than that of the pinion gear, is transmitted via the driven gear to the worm, so that dense winding is possible without an overly large gear-down ratio, and the diameter of the driven gear is kept small. Moreover, because the drive gear is provided on the handle, and the driven gear is provided on the worm, provision of these gears nonetheless hardly affects the reel body size.

A dense-winding structure is therefore realized with a compact reel body.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spinning-reel reciprocating device for use in a spinning reel having a rotor driving mechanism, said rotor driving mechanism having a master gear shaft provided in a reel body of the spinning reel, a master gear for rotating unitarily with the master gear shaft, and a pinion gear for meshing with the master gear, said reciprocating device being disposed along an axis skew with the master gear shaft for reciprocating a spool shaft, back and forth in cooperation with rotation of a handle, a spool being fitted to a forward end of the spool shaft, said spinning reel reciprocating device comprising:

a drive gear provided non-rotatably on the master gear shaft, said drive gear being disposed facing the master gear with the pinion gear disposed therebetween;

a worm superficially into which intersecting helical grooves are formed, disposed substantially paralleling the spool shaft;

a driven gear to which rotation of the drive gear is transmitted, provided non-rotatably on the worm; and a slider onto which the spool shaft is fitted immovably at least back-and-forth, said slider fitted reciprocatingly in the reel body and having an engagement member for engaging with said helical grooves.

2. A spinning-reel reciprocating device disposed along an axis skew with a handle rotation shaft provided in the reel body of a spinning-reel, for reciprocating a spool shaft, forward-endwise onto which a spool is fitted, back and forth in cooperation with rotation of the handle, the spinning reel reciprocating device comprising:

a drive gear provided non-rotatably on the handle rotation shaft;

a worm superficially into which intersecting helical grooves are formed, disposed paralleling the spool shaft;

a driven gear to which rotation of the drive gear is transmitted, provided non-rotatably on the worm;

a slider onto which the spool shaft is fitted immovably at least back-and-forth, said slider fitted reciprocatingly in the reel body and having an engagement member for engaging with said helical grooves; and an intermediate gear unit rotative about a rotational axis paralleling the handle rotation shaft, meshing with said drive gear and said driven gear.

3. A spinning-reel reciprocating device as set forth in claim 2, wherein:

the intermediate gear unit is a cylindrical gear meshing with said drive gear and said driven gear at the same time; and the driven gear is a crown gear rotative about a rotational axis intersecting with said intermediate gear unit.

4. A spinning-reel reciprocating device as set forth in claim 2, wherein said intermediate gear unit includes:

a first gear meshing with said drive gear; and a second gear rotative unitarily with the first gear for meshing with said driven gear, and disposed immediately adjacent to said first gear.

5. A spinning-reel reciprocating device as set forth in claim 4, wherein:

said second gear is a cylindrical gear smaller in diameter than said first gear; and said driven gear is a crown gear rotative about a rotational axis that relative to the intermediate gear unit is intersecting.

6. A spinning-reel reciprocating device as set forth in claim 4, wherein said second gear and said driven gear are bevel gears rotative about mutually intersecting rotational axes.

7. A spinning-reel reciprocating device as set forth in claim 4, wherein said second gear has fewer teeth than said driven gear.

8. A spinning reel comprising:

a rotor;

a spool disposed adjacent to said rotor and having a spool shaft for shifting back and forth; and a reel unit having a rotor driving mechanism for rotating said rotor, an oscillating mechanism for shifting said spool shaft back and forth, and a handle assembly having a handle rotation shaft, said rotor driving mechanism including
- a master gear shaft that receives rotation of said handle rotation shaft,
- a master gear that rotates unitarily with said master gear shaft, and
- a pinion gear that meshes with said master gear to rotate said rotor, said oscillating mechanism including
- a drive gear that rotates unitarily with said master gear shaft, said drive gear being disposed facing said master gear with said pinion gear disposed therebetween,
- a worm superficially into which intersecting helical grooves are formed, disposed substantially paralleling said spool shaft,
- a driven gear to which rotation of said drive gear is transmitted, provided non-rotatably on said worm, and
- a slider fitted axially immovably onto said spool shaft, said slider being fitted reciprocatingly in said reel body and having an engagement member for engaging with said helical grooves.

9. A spinning-reel as set forth in claim 8, further comprising an intermediate gear unit rotative about a rotational axis paralleling said master shaft, meshing with said drive gear and said driven gear.

10. A spinning-reel as set forth in claim 9, wherein said intermediate gear unit is a cylindrical gear meshing with said drive gear and said driven gear at the same time, and the driven gear is a crown gear rotative about a rotational axis intersecting with said intermediate gear unit.

11. A spinning-reel as set forth in claim 9, wherein said intermediate gear unit includes
- a first gear meshing with said drive gear; and
- a second gear rotative unitarily with the first gear, meshing with said driven gear, and disposed immediately adjacent to said first gear.

12. A spinning-reel as set forth in claim 11, wherein said second gear is a cylindrical gear smaller in diameter than said first gear; and said driven gear is a crown gear rotative about a rotational axis that is intersecting relative to said intermediate gear unit.

13. A spinning-reel as set forth in claim 11, wherein said second gear and said driven gear are bevel gears rotative about mutually intersecting rotational axes.

14. A spinning-reel as set forth in claim 11, wherein said second gear has fewer teeth than said driven gear.

\* \* \* \* \*